(12) United States Patent
Mosgrove et al.

(10) Patent No.: US 6,317,313 B1
(45) Date of Patent: Nov. 13, 2001

(54) CASE AND COVER FOR AN ELECTRONIC DEVICE

(75) Inventors: Isaac J. Mosgrove; Wayne F. Larson, both of Salem; Matthew S. Hill, Sublimity; Jon Marc Luebeck, Stayton; Doug R. Porter; Dirk L. Bellamy, both of Salem, all of OR (US)

(73) Assignee: Interlogix, Inc., Salem, OR (US)

( * ) Notice: Subject to any disclaimer, the term of this patent is extended or adjusted under 35 U.S.C. 154(b) by 0 days.

(21) Appl. No.: 09/505,055

(22) Filed: Feb. 16, 2000

Related U.S. Application Data

(63) Continuation of application No. 09/437,354, filed on Nov. 9, 1999.

(51) Int. Cl.$^7$ ...................................................... G06F 1/16
(52) U.S. Cl. ......................... 361/680; 361/679; 345/168; 400/691
(58) Field of Search ..................................... 361/679–683; 341/22; 345/168–172, 905; 235/145; 248/917; 400/489, 682, 691–693; 312/208.1, 208.4; 364/708.1

(56) References Cited

U.S. PATENT DOCUMENTS

| | | |
|---|---|---|
| D. 237,195 | 10/1975 | Kitai et al. ............................... D18/7 |
| D. 282,745 | 2/1986 | Brown .................................. D14/241 |
| D. 325,728 | 4/1992 | Mayo et al. ......................... D14/338 |
| D. 327,881 | 7/1992 | McFarlane .......................... D14/399 |
| 4,727,368 | 2/1988 | Larson et al. .......................... 340/5.6 |
| 4,851,652 | 7/1989 | Imran ................................... 235/382 |
| 5,063,484 | 11/1991 | Tanaka ................................. 362/109 |
| 5,280,518 | 1/1994 | Danler et al. .................... 379/102.06 |
| 5,408,044 | 4/1995 | Spiegel ................................ 174/52.1 |
| 5,475,375 | 12/1995 | Barrett et al. ....................... 340/5.25 |
| 5,644,516 | 7/1997 | Podwalny et al. ................... 361/681 |
| 5,654,696 | 8/1997 | Barrett et al. ....................... 340/5.33 |
| 5,715,524 | 2/1998 | Jambhekar, Jr. ........................ 455/90 |
| 5,766,794 | 6/1998 | Brunette et al. ....................... 429/97 |
| 5,847,698 | * 12/1998 | Reavey et al. ....................... 345/173 |
| 5,848,298 | 12/1998 | Steere, Jr. et al. .................... 710/62 |
| 5,867,140 | 2/1999 | Rader ................................... 345/98 |
| 5,890,997 | 4/1999 | Roth ....................................... 482/8 |
| 6,046,728 | * 4/2000 | Hume et al. ......................... 345/157 |
| 6,046,730 | * 4/2000 | Bowen et al. ....................... 345/168 |
| 6,163,326 | * 12/2000 | Klein et al. .......................... 361/680 |
| 6,166,722 | * 12/2000 | Kawabe et al. ..................... 361/684 |
| 6,166,737 | * 12/2000 | Lee et al. ............................. 345/343 |

OTHER PUBLICATIONS

Herrington Catalog, Christmas Eve 1999.

* cited by examiner

*Primary Examiner*—Leo P. Picard
*Assistant Examiner*—Hung Van Duong
(74) *Attorney, Agent, or Firm*—Klarquist Sparkman, LLP

(57) ABSTRACT

A cover for an electronic device having a screen that includes a window and at least one device operating feature. The cover is coupleable with the electronic device such that the window of the cover overlies at least a portion of the screen and the electronic device is operable with the device operating feature of the cover.

7 Claims, 9 Drawing Sheets

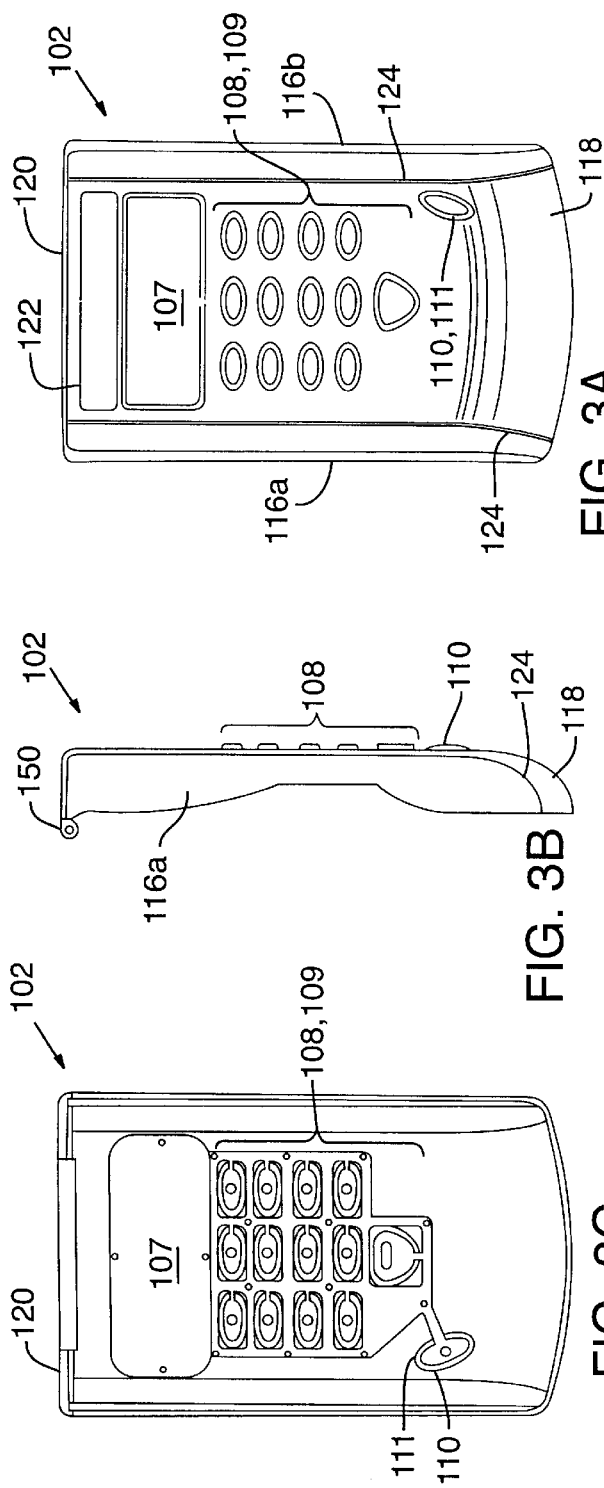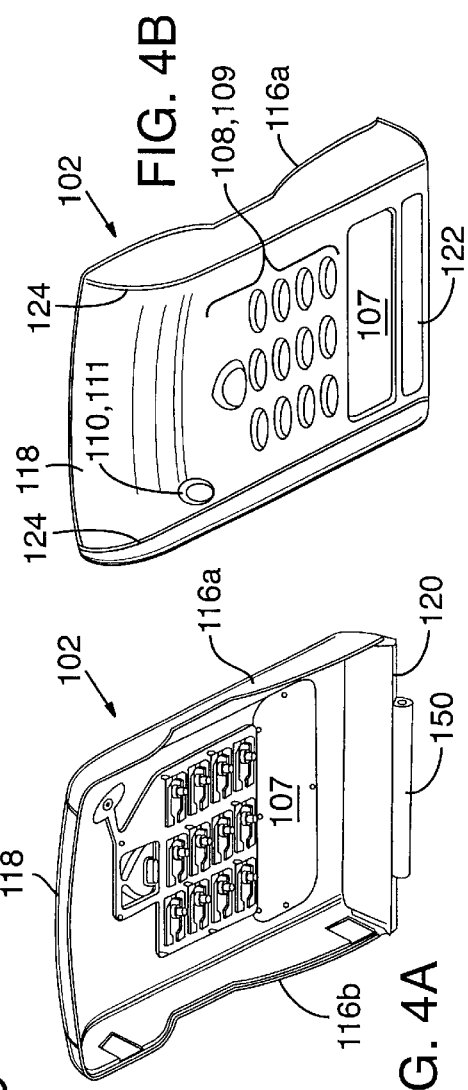

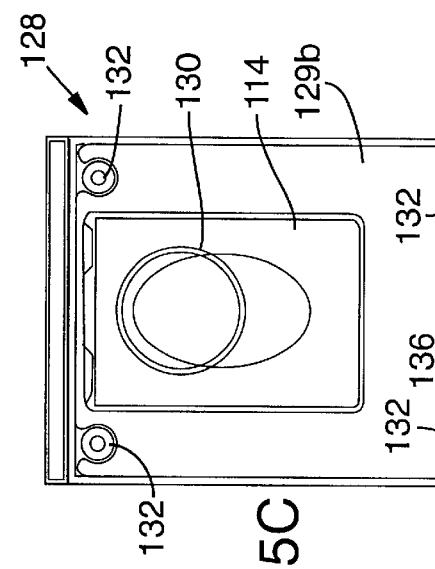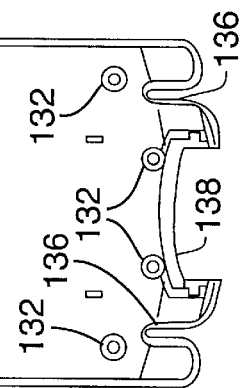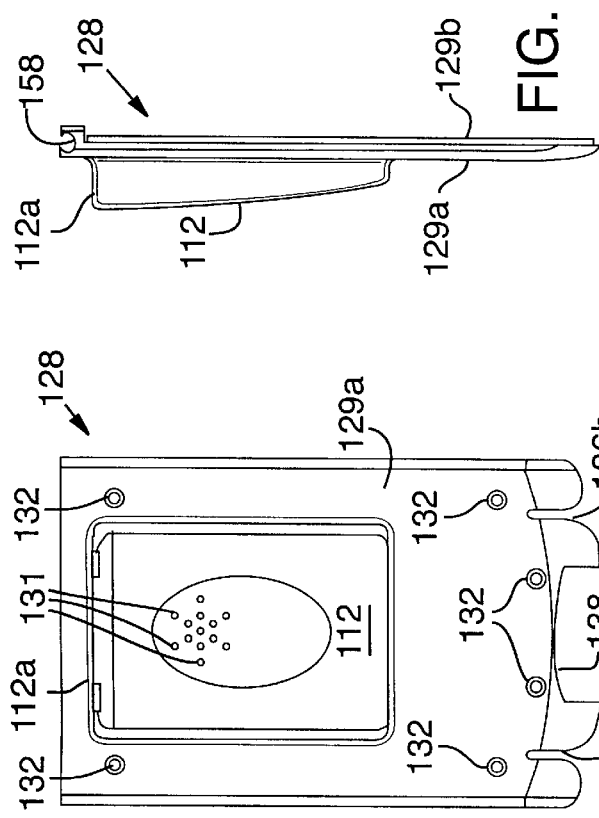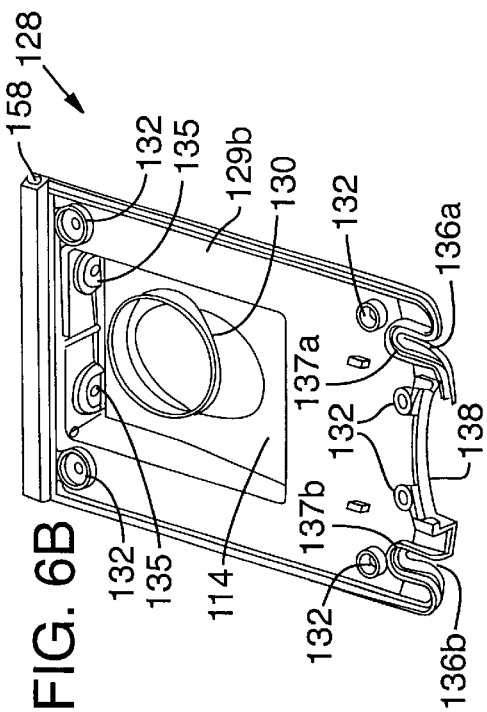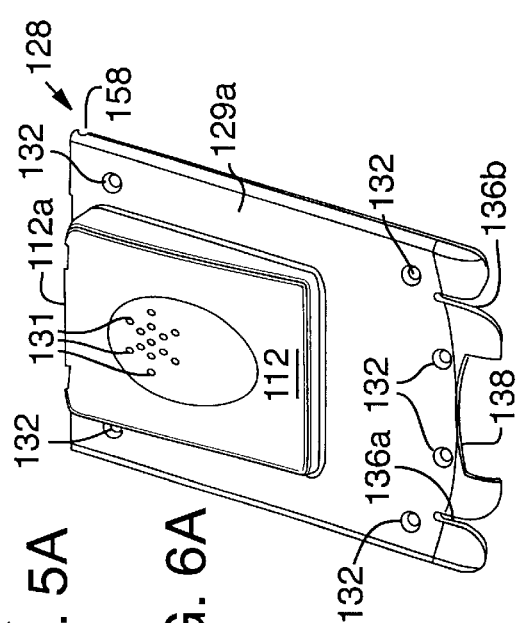

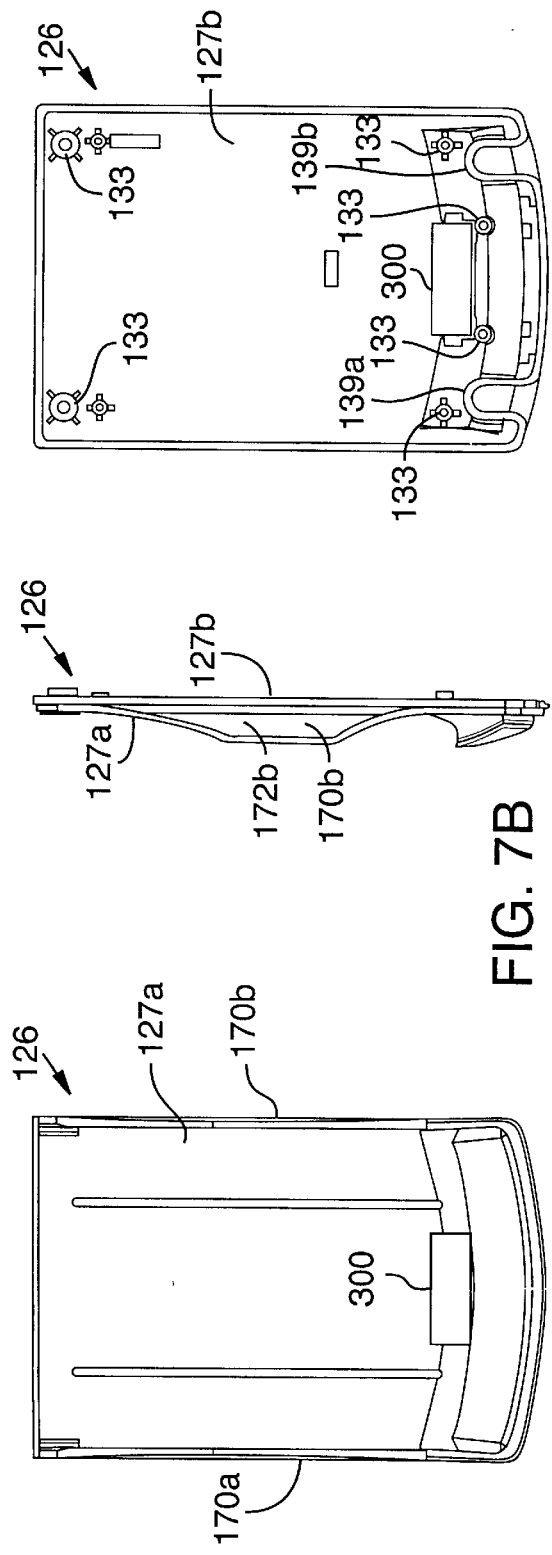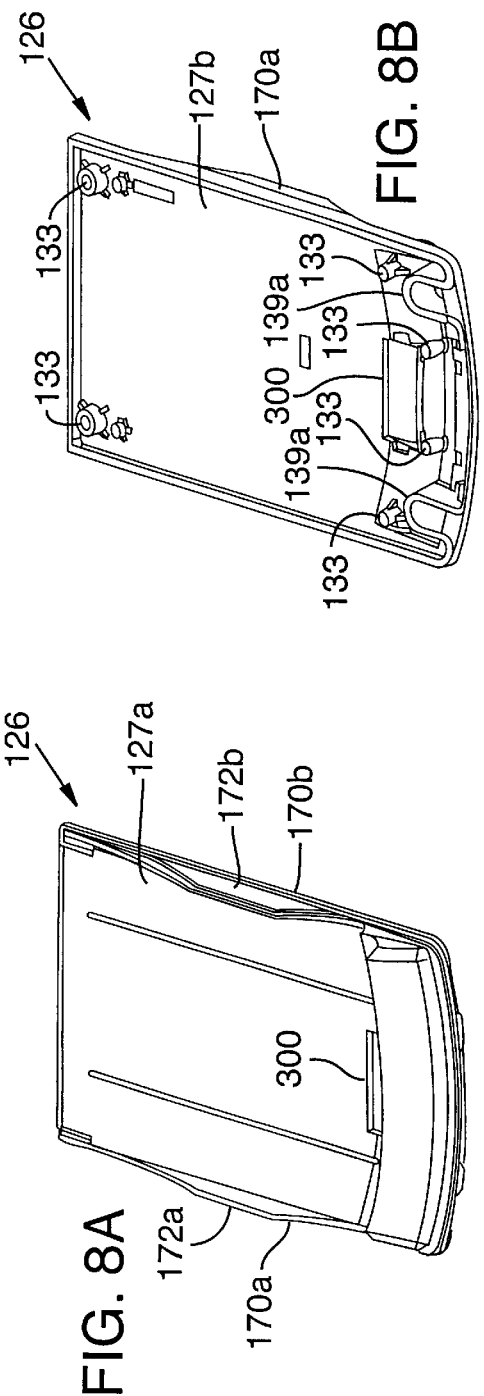

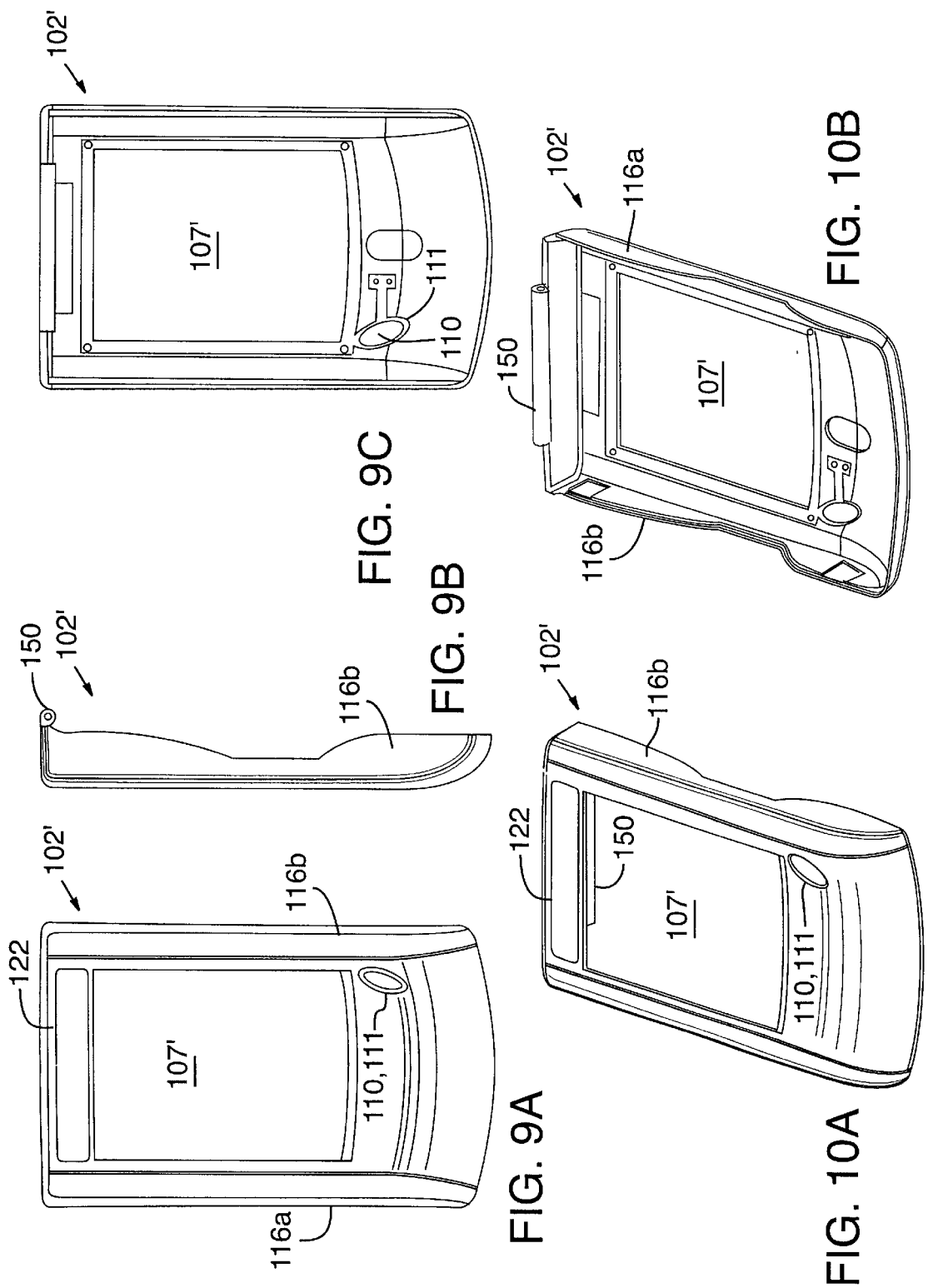

CASE AND COVER FOR AN ELECTRONIC DEVICE

RELATED APPLICATION

This application is a continuation of U.S. patent application Ser. No. 09/437,354 filed Nov. 9, 1999.

FIELD

This invention relates to a case and a cover for an electronic device, such as a personal digital assistant.

BACKGROUND

Electronic devices, such as so-called personal digital assistants, are widely used today. As used herein, a personal digital assistant or PDA is understood to encompass a palmtop computer, a handheld computer, and a notebook computer, as well as any other type of other portable microprocessor-based device.

Personal digital assistants are used to perform a full array of computing tasks in all environments. Some use PDAs simply to provide the same computing functions traditionally found on a desktop computer, whereas others take advantage of the portability of PDAs for the added functions of specialized data collection or communication with other devices.

Because of their convenient size (some PDAs fit within a shirt pocket), PDAs often have a stylus-driven input and command routine, together with several manual controls (e.g., an array of a few buttons). In a PDA, the traditional keyboard may be omitted in favor of a touch-sensitive "keyboard" that can be displayed on the screen of the device with any desired "key" being selected by tapping that key with a stylus.

With their ever-decreasing size, PDAs remain susceptible to permanent loss of function and data through being dropped or subjected to other damage. In addition, most PDAs are not designed for weather resistance, and thus can become damaged if exposed to moisture.

Traditional covers for the screen of an electronic device, and cases that provide full protection for the back of the device as well as for the screen, typically do not allow the device to be operated while it is in the cover or in the case. Rather, the device must first be removed from the cover or the case before it can be used. Thus, traditional covers and cases are inconvenient.

It would be desirable to provide a cover and a case that would allow the PDA to be operated with at least some of its functionality while being protected within the cover or the case.

SUMMARY

According to the present invention, there is provided a cover for an electronic device that allows the device to be operated while the cover is in place over the screen of the device with a device operating feature on the cover. A case that includes the cover as a front cover, as well a rear cover coupled to the front cover, is also provided. The cover and the case help protect the electronic device against shock and weather.

The cover may include a window that allows at least a portion of the screen of the device to remain visible through the window. The device operating feature of the cover may be one or more keys or buttons that overlie and are depressible into contact with command receptive portions of the device, e.g., touch-sensitive portions of the screen of the device or buttons on the device. The device operating feature may also be an aperture in the cover through which a command actuator, e.g., a stylus, a pen or a user's finger, can be inserted to operate the device.

The cover may also be electrically connectable to the device. The rear cover of the case may be shaped to engage another device, and may be electrically connectable to the device.

The case may be shaped to engage a stand, and, when engaged, may form an electrical connection with the stand such that power can be received from the stand (e.g., to power and recharge the case and/or the device).

BRIEF DESCRIPTION OF THE DRAWINGS

FIGS. 3A, 3B and 3C are front side, left side and rear side views, respectively, of the front cover of the case according to a first embodiment as shown in FIG. 1.

FIGS. 4A and 4B are additional perspective views of the front cover according to the first embodiment.

FIGS. 5A, 5B and 5C are rear side, left side and front side views, respectively, of an outer portion of the rear cover.

FIGS. 6A and 6B are additional perspective views of the outer portion of the rear cover.

FIGS. 7A, 7B and 7C are front side, right side and rear side views, respectively, of an inner portion of the rear cover.

FIGS. 8A and 8B are additional perspective views of the inner portion of the rear cover.

FIGS. 9A, 9B and 9C are front side, right side and rear side views, respectively, of a front cover of the case according to a second embodiment.

FIGS. 10A and 10B are additional perspective views of the front cover according to the second embodiment.

DETAILED DESCRIPTION

According to the invention, a cover for an electronic device (e.g., a PDA) includes a window that allows at least a portion of the screen of the device to remain visible through the window, and a device operating feature that allows the device to be operated while the cover is in place over the device. The cover protects the electronic device against shock and weather, and may be used as a front cover of a case for the device that also has a rear cover.

The device operating feature of the cover may be one or more keys or buttons that overlie and are depressible into contact with command receptive portions of the device, e.g., touch-sensitive portions of the screen of the device or buttons on the device. The device operating feature may also be an aperture in the cover through which a command actuator, e.g., a stylus, a pen or a user's finger, can be inserted to operate the device.

The cover may also be electrically connectable to the device. The rear cover of the case may be shaped to engage another component, and may be electrically connectable to the component.

The case may be shaped to engage a stand, and, when engaged, may form an electrical connection with the stand such that (1) power can be received from the stand (e.g., to power and recharge the case and/or the device) and (2) data can be exchanged with the stand.

Figure 1:
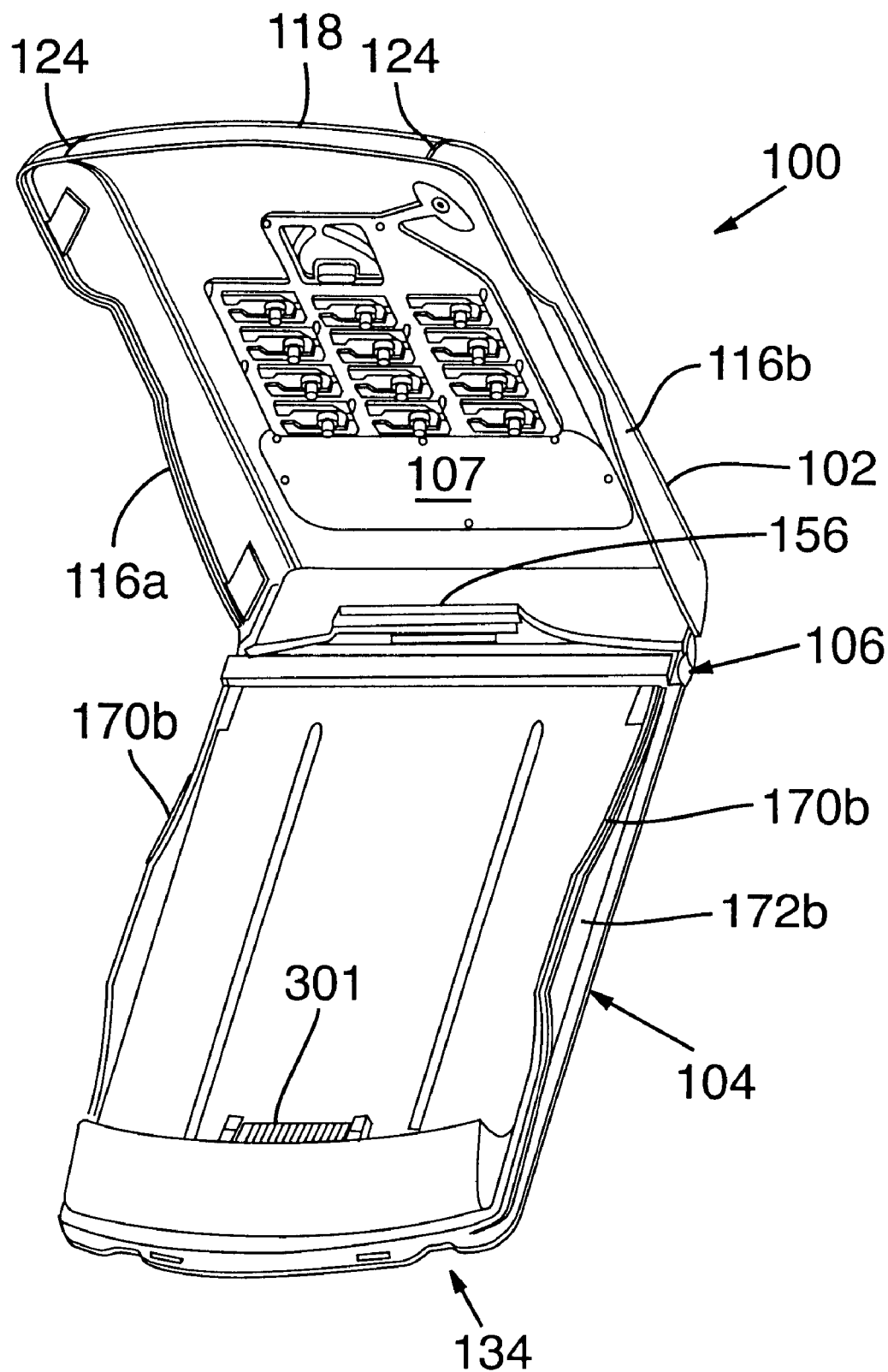
FIG. 1 is a perspective view of the case in an opened position showing the front cover coupled to the rear cover.
Figure 2:
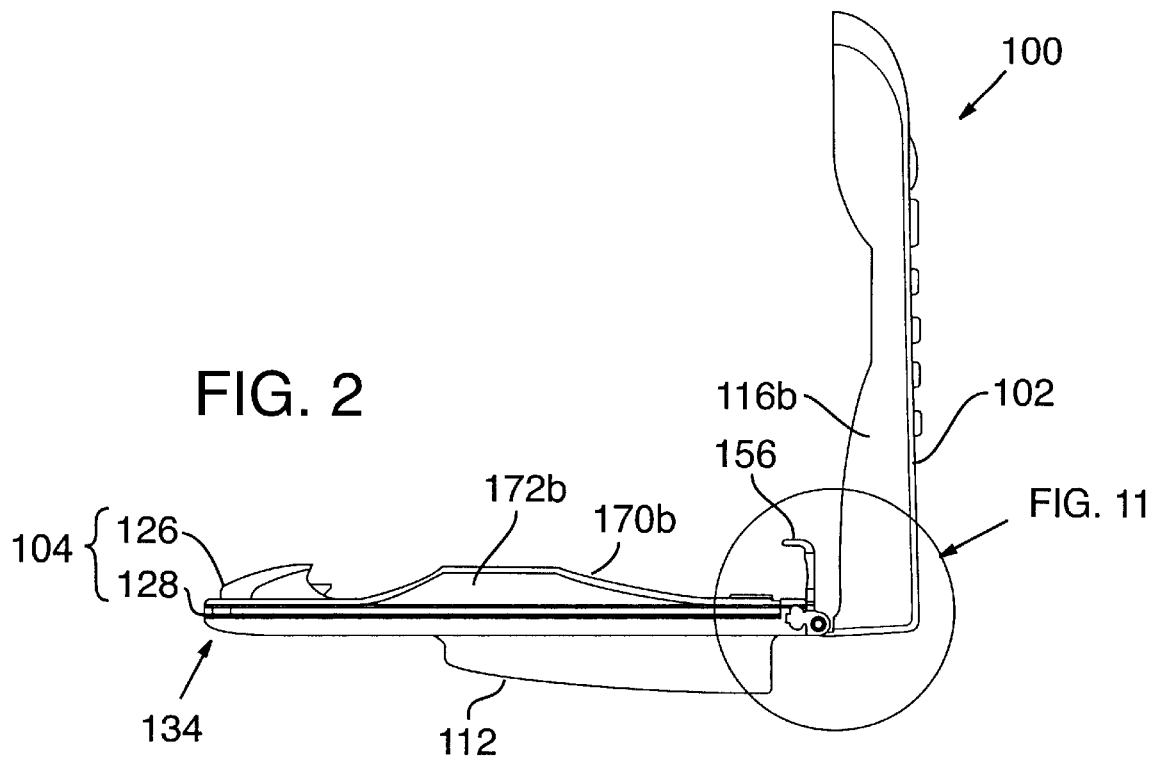
FIG. 2 is a side view of the case of FIG. 1 showing the coupling between the front cover and the rear cover.

According to a specific implementation as shown in FIGS. 1 and 2, a case 100 for an electronic device D (FIG. 12B) has a front cover 102 coupleable with a rear cover 104. The front cover 102 and the rear cover 104 are shaped to fit together and form a space for housing the device D when the front cover 102 and the rear cover 104 are closed. In some applications, a cover such as the front cover 102 can be used alone without the rear cover 104.

The case 100 can be sized to accommodate any particular electronic device. In the illustrated implementation, the case 100 is sized to accommodate the Palm V™ series of personal digital assistants manufactured by 3Com Corporation. As most clearly illustrated in FIG. 2, the case 100 can be opened to insert, remove or access the device, or to otherwise access the interior of the case 100.

In the illustrated implementation, the front cover 102 is pivotably connected to the rear cover 104 by a hinge 106. Details of the hinge 106 are discussed below. As illustrated, the hinge 106 is positioned adjacent a top edge of the case 100. The hinge 106 could also be positioned along any of the other edges of the case 100. The front cover 102 and the rear cover 104 can be positively latched together in the closed position by a mechanical catch or magnetic latch (not shown).

Referring to FIGS. 1, 2, 3A–3C, 4A and 4B, the front cover 102 has an outer surface with a window 107, a keypad 108 with individual keys projecting through corresponding key apertures 109, and a power button 110 projecting through a corresponding button aperture 111. The front cover 102 also has a nose-shaped front portion 118, shaped sides 116a, 116b, a relieved portion 122 (e.g., to receive an insignia), and accent grooves 124.

The window 107 is made from transparent plastic or other suitable material. The window 107 is sized and positioned to permit a user to view at least a portion of the screen (or display) of the device when the case 100 is closed with the front cover 100 in overlying relation with the screen of the device. Thus, the user can view the display of the device while the device is operated.

In the illustrated implementation, the keypad 108 and the button 110 are formed together from an elastomeric material. The keypad 108 has twelve keys arranged in a 3×4 matrix (including, e.g., number keys 1-0 and two other keys) and a larger key positioned centrally below the lowest row (e.g., a command key). Preferably, the keys are joined together without gaps to provide additional resistance to entry of moisture through the apertures 109 and 111. For example, the keys can be raised areas of a continuous sheet of molded flexible plastic material, with the sheet of plastic material located on the inside of the cover with the sheet covering all of the key openings.

The keys of the keypad 108 are each independently depressible into contact with a portion of the screen of the device when the front cover 102 is in overlying relation with the device. The screen of the device is programmed to be receptive to touch input. Preferably, the inputs received by the screen via the keys of the keypad 1 08 are shown on the portion of the screen visible through the window 107.

Figure 12A:
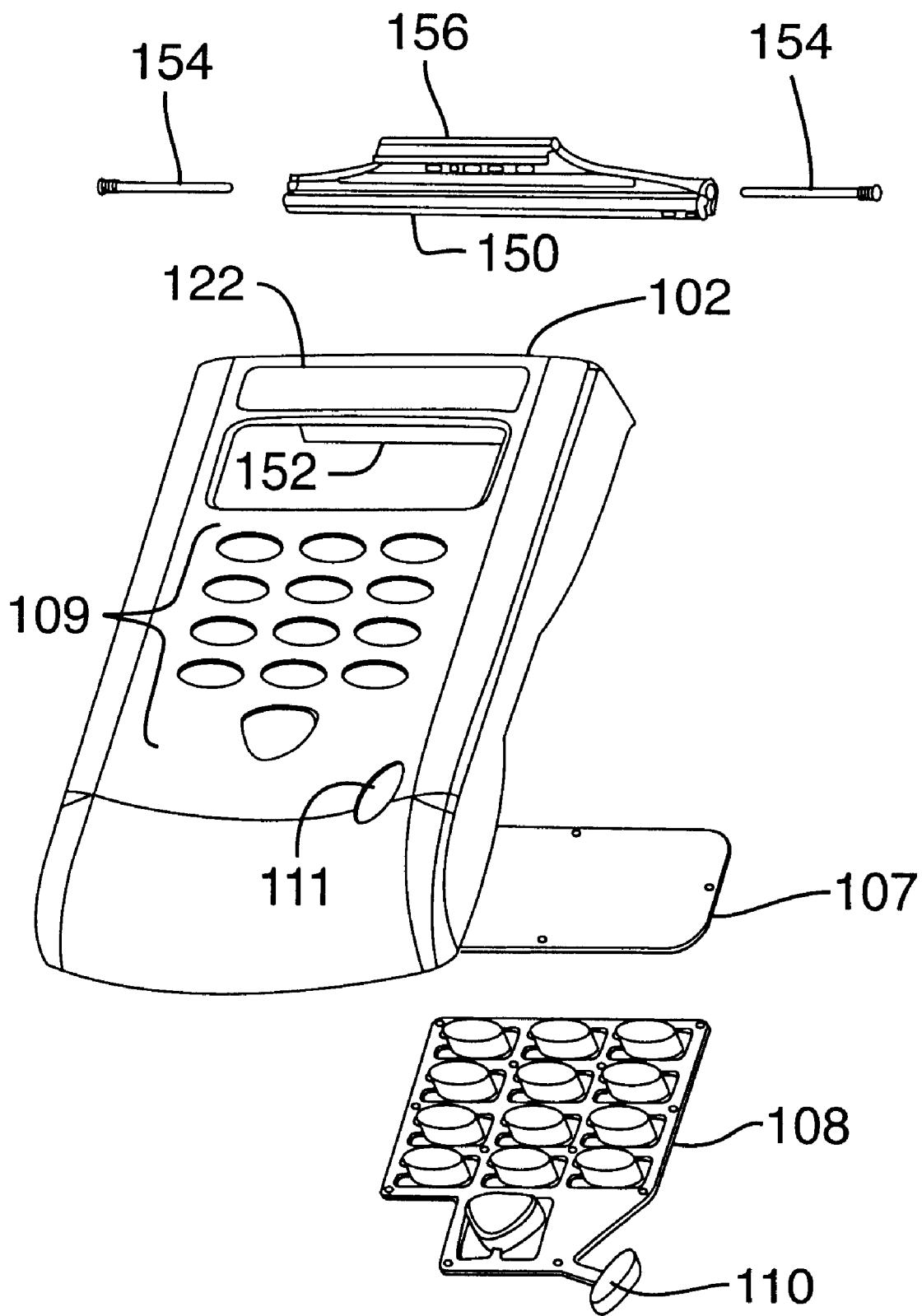
FIGS. 12A and 12B are exploded views of the case, together with a PDA and components of the case.
Figure 12B:
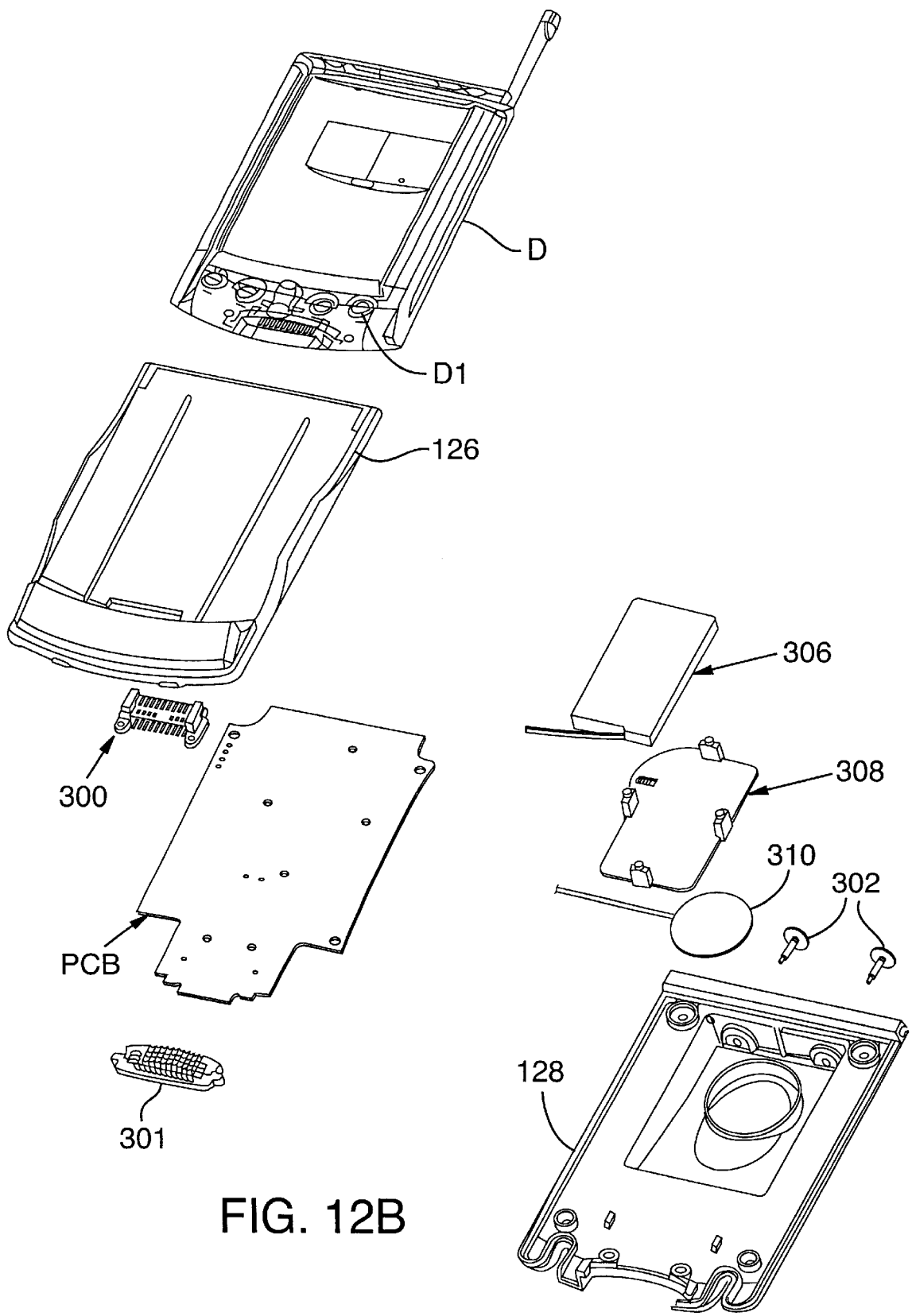

The button 110 of the cover 102, which is preferably joined to the key pad 108, can be depressed to operate a corresponding button $D_1$ (e.g., a power button) of the device D (see FIG. 12B). The button 110 is positioned on the front cover 102 to be aligned with and above the button $D_1$ when the cover 102 is in overlying relation with the device D.

As illustrated in FIG. 2, the rear cover 104 is formed of an inner rear cover portion 1 26 joined to an outer rear cover portion 128. As illustrated in FIGS. 7A–7C, 8A and 8B, the inner rear cover portion 126 has an inner side 127a that receives a bottom side of a device when the device is inserted into the case 100, and an opposite outer side 127b. As illustrated in FIGS. 5A–5C, 6A and 6B, the outer rear cover has an outer side 129a that forms an outer surface of the rear cover 104, and an opposite inner side 129b. The inner side 129b of the outer rear cover portion 128 contacts the outer side 127b of the inner rear cover portion 126 when the outer rear cover portion 128 and the inner rear cover portion 126 are joined together.

As illustrated, the outer rear cover portion 128 has apertures 132 through which fasteners (e.g., screws) can be driven and received in corresponding bosses 133 formed in the inner side 129b of the inner rear cover portion 126. Depending upon the thickness of the material used for the inner rear cover portion 126 and the outer rear cover portion 128, threaded inserts may be used to support the fasteners.

As illustrated, the rear cover 104 has a protruding portion 112. The protruding portion 112 may be shaped for engagement with another device, and may include structure to electrically connect the case 100 with the device, e.g., to provide power to the external device or to transfer data between the external device and the case 100. As illustrated most clearly in FIGS. 5C and 6D, the protruding portion 112 defines a recess 114 in the inner side 129b of the outer rear cover portion 128. Within the recess 114, there is a circular rib 130 positioned, e.g., to support electronic components. As illustrated in FIGS. 5A and 6A, speaker apertures 131 are formed in the protruding portion 112 to permit communication between the case 100 and an adjacent external device as described below in more detail. As illustrated most clearly in FIGS. 5A and 6B, a top surface 112a of the protruding portion 112 includes apertures 135 sized to receive contacts (such as the contacts 302 shown in FIG. 12B) for electrically connecting the case 100 to another device.

Alternatively, the case can be configured to communicate with another device by infrared communication. A device such as the Palm V™ includes an infrared transmitter and receiver, and thus the case 100 could be provided with an aperture positioned to allow the infrared transmitter and receiver to function while the device is in the case 100. Additionally, the case 100 itself could be configured with an infrared transmitter or receiver (not shown). Also, the case 100 could be configured with a bar code reader.

As illustrated, e.g., in FIGS. 2, 7B and 8A, the inner rear cover portion 126 has sides 170a, 170b that are shaped to fit together with the sides 116a, 116b, respectively, of the front cover 102 when the front cover 102 and the rear cover 104 are in a closed position. The sides 170a, 170b each have an enlarged holding portion 172a, 172b, respectively, that allows the user to firmly grasp the case 100 along it sides, e.g., during the movements necessary to engage the protrusion 112 with another component. By configuring the holding portions 172a, 172b on the inner rear cover portion 126 rather than the front cover 102, stress is relieved from the hinge 106. In addition, the holding portions 172a, 172b serve to keep the device within the case 100 from shifting laterally, e.g., when the front cover 102 of the case 100 is opened.

Figure 14:
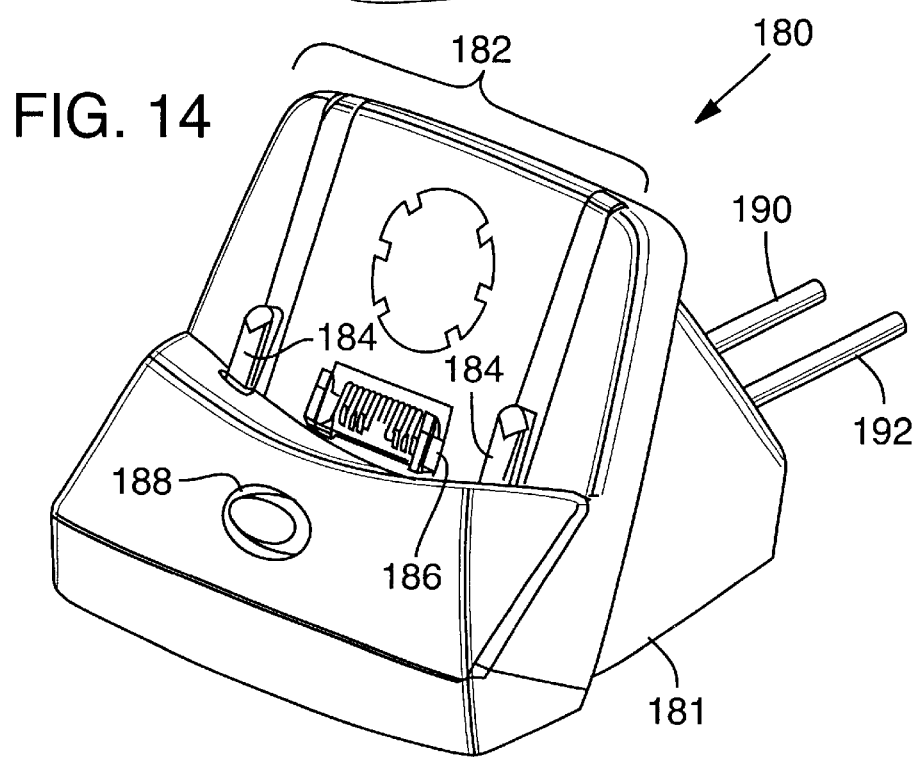
FIG. 14 is a perspective view of a stand designed to receive and electrically connect with the case.

As illustrated in FIGS. 1 and 2, the rear cover 104 has a stand engaging portion 134 that allows the case 100 to be engaged with a stand (see FIG. 14). The stand engaging portion 134 includes a pair of slots 136a, 136b formed in the outer rear cover portion 128 adjacent its side edges and a notch 138 positioned between the slots 136a, 136b. Each of the slots 136a, 136b on the outer side 129a communicates with a corresponding one of a pair of U-shaped grooves 137a, 137b, respectively, that are formed in the inner side 129b of the outer rear cover portion 128. As illustrated in FIGS. 7C and 8B, the inner rear cover portion 126 includes corresponding U-shaped grooves 139a, 139b that are aligned with the U-shaped grooves 137a, 137b, respectively, when the inner rear cover portion 126 and the outer rear cover portion 128 are assembled together.

Figure 11:
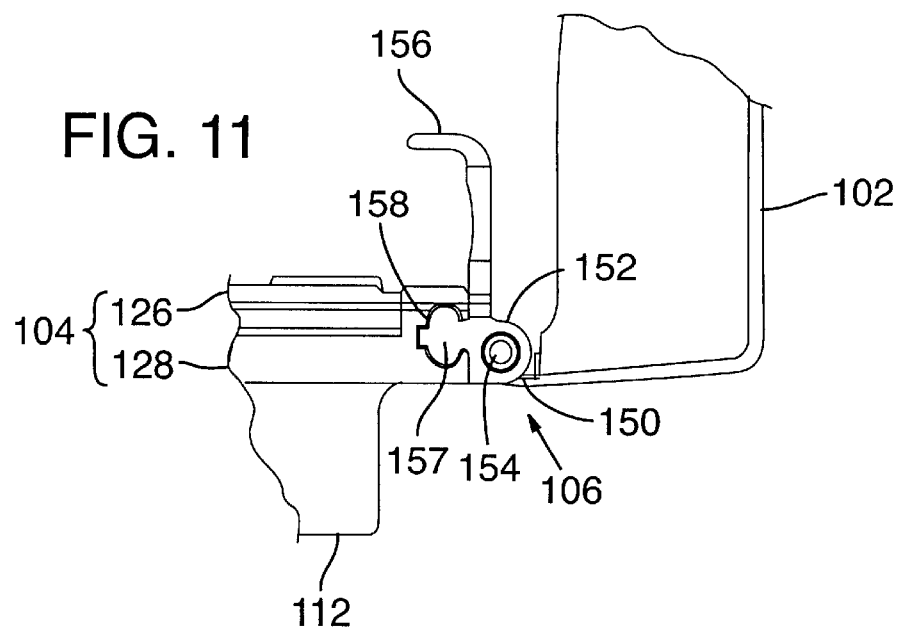
FIG. 11 is a magnified view of a portion of FIG. 2 showing the coupling between the front cover and the rear cover in a larger scale.

As most clearly illustrated in FIG. 11, a specific implementation of the hinge 106 includes a male hinge member 150 extending from the front cover 102 that engages within a female hinge member 152 coupled to the rear cover 104. The male hinge member 150 and the female hinge member 152 have bores dimensioned to receive hinge pins 154 inserted from opposite sides (FIG. 12A). As illustrated, the female hinge member 152 also includes a projecting retainer 156 dimensioned to secure the top front corner of the device in place within the case 100.

In a specific implementation, the female hinge member 152 has a tongue portion 157 that is slidably engageable with a corresponding groove 158 formed in the outer rear cover portion 128. The arrangement of the tongue portion 157 and groove 158 permits the front cover 102 and the female hinge member 152 to be detached from the rear cover 104 (with the female hinge member 152 remaining connected to the front cover 102 by the hinge pins 154 and the male hinge member 150). Thus, substitute front cover assemblies (i.e., front covers with female hinge members secured by hinge pins) are readily interchangeable, e.g., as desired for different uses of the case 100 and the device. If necessary, flash ribs (not shown) can be added to the tongue portion 157 such that the tongue portion 157 engages the groove 158 with sufficient friction.

A suitable substitute front cover is a front cover 102' according to a second embodiment, as illustrated in FIGS. 9A, 9B, 9C, 10 A and 10B. The front cover 102' is similar to the front cover 102, except that the front cover 102' has a larger window 107', which permits a user to view a substantial portion of the screen of the device, in place of the keypad 108. Similar to the cover 102, the cover 102' has the button 110 that is depressible to operate a button (e.g., a power button) on the device.

Figure 13:
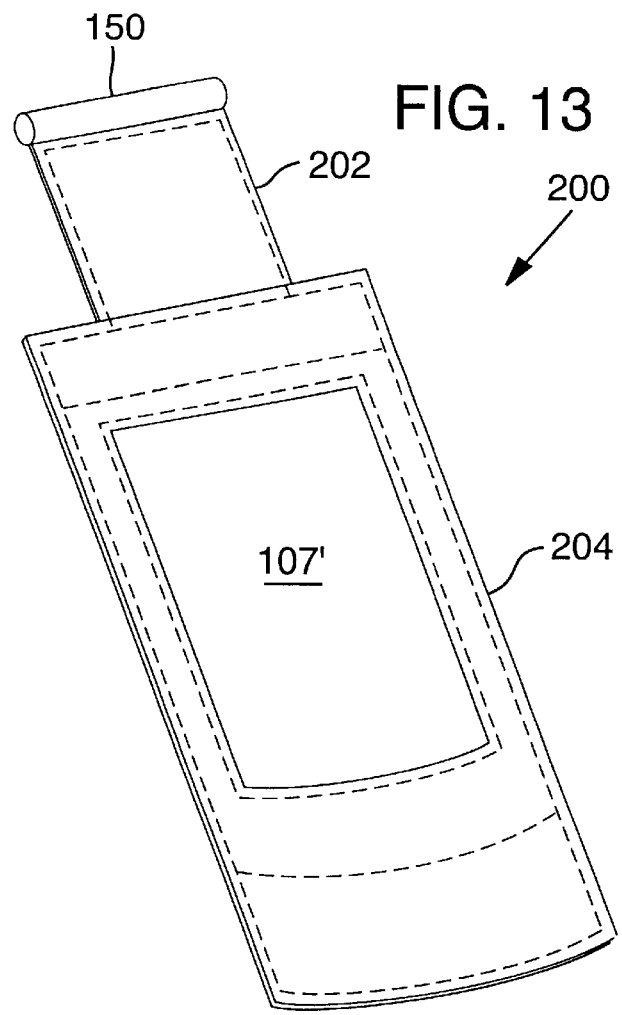
FIG. 13 is a perspective view of an optional soft front cover of the case according to a third embodiment.

Another suitable front cover is a soft cover 200 as illustrated in FIG. 13. The soft cover 200 is made of a flexible material (e.g., leather or fabric), and is finished with stitching near its borders. An extension flap 202 connects the male hinge portion 150 to a main cover portion 204. The soft cover 200 can be substituted for the front cover 102 or the front cover 102', e.g., for aesthetic reasons or when the protection of a hard front cover is not required.

An exploded view of the case 100 and various components within the case 100, including the device D, is illustrated in FIGS. 12A and 12B. As stated above, the case 100 can be configured to take advantage of the computing, display, communication and control features of the device D, which may be general in nature, and to interface with other devices for specific tasks, based on additional supporting electronics housed within the case 100. As illustrated in FIG. 12B, the case 100 includes a connector 301 that connects to a port S of the device D when the device D is inserted in the case 100. The connection between the port S and the connector 301 allows data to be exchanged between the case 100 and the device D. Data received from the device D may be, e.g., communicated to an external device (e.g., through a specific interface or through the stand 180, which is described below). Data received by the device D may be used, and, optionally stored in a memory of the device D. The connector 301 is also capable of providing power to the device D to operate the device D or to recharge its battery.

In a specific example, the cover 100 is adapted to interface with a part of a controlled access system, e.g., a real estate lockbox, or other similar device, as a part of an electronic access control system. Such a system is disclosed, e.g., in commonly assigned U.S. Pat. No. 5,475,375. In the specific example, the contacts 302 extending through the surface 112a of the protrusion permit data to be exchanged between the case 100 and a real estate lockbox designed to receive an electronic keypad. The functions of the electronic keypad are carried out by using the keypad 108 in conjunction with the device 108.

In the specific example, the components of the case 100 include a microprocessor-based circuit on a circuit board 304, a battery 306 that powers the circuit board 304, a base 308 that attaches the battery 306 to the circuit board 304, and a piezo electric unit 310 responsive to signals from the circuit that selectively vibrates to produce tones to communicate with the lockbox. Thus, the cover 100 with the device D can communicate with a lockbox using FSK communication protocols. The case 100 also includes a connector 312 that allows the case 100 (and the device D, when connected to the case 100 via the connector 300) to communicate with an external device by a wired connection and/or to receive power from an external power source.

A specific embodiment of a stand 180 designed to receive and function with the case 100 is illustrated in FIG. 14. The stand 180 has a base 181 designed to rest on a flat surface, e.g., a table or a desk. The stand 180 also has a case receiving portion 182 shaped to receive the case 100. The case receiving portion 182 includes a pair of spaced apart ribs 184. The ribs 184 are positioned to slidingly engage the slots 136a, 136b and the U-shaped grooves 139a/137a, 139b/137b of the rear cover 104 when the case 100 is engaged with the stand 180.

A connector 186 is positioned between the ribs 184. The connector 186 is designed to mate with a second connector 300 of the case 100, thereby connecting the case 100 with the stand 180. The stand 180 receives power, e.g., from an outside power source such as a household AC power outlet, via a power cord 190. The stand also includes a data line 192 (e.g., a telephone line) for communicating data to and from the stand 180. The power cord 190 and the data line 192 are each connected to the connector 186. An indicator light 188 is positioned on a front surface of the stand 180 to indicate, e.g., a current operating mode. In a specific embodiment, the indicator light 188 is configured to show a charging level of the case 100 and/or the device D within the case 100 (e.g., by changing from a red light indicating "low charge" level to a green light indicating "full charge" level as the charge level increases).

Except as otherwise noted, the front cover, the rear cover, the hinge, the retainer and other components of the case are formed of a suitable material, such as an impact resistant plastic that will withstand some shock if dropped. Alternatively, the front cover 102, the front cover 102' or the rear cover 104 can be formed of a metal, such as aluminum, for improved aesthetics and increased durability. If necessary, seals can be used between various components to provide additional weather resistance, such as between the inner rear cover portion 126 and the outer cover portion 128.

Having illustrated and described the principles of our invention with reference to several preferred embodiments, it should be apparent to those of ordinary skill in the art that the invention may be modified in arrangement and detail without departing from such principles.

What is claimed is:

1. A cover for an electronic device having a screen, the cover comprising a window and at least one device operating feature, the cover being coupleable with the electronic device such that the window of the cover overlies at least a portion of the screen of the electronic device, wherein the electronic device is operable with the device operating feature of the cover, wherein the device operating feature includes a first button and a second button, and the electronic device includes respective first and second command receptive features that allow a user to operate the electronic device, wherein the first command receptive feature is a touch-sensitive portion of the screen and the second command receptive feature is a key, and wherein when the cover is coupled to the electronic device, the first button is positioned to overlie the touch-sensitive portion of the screen and the second button is positioned to overlie the key.

2. The cover of claim 1, wherein the device operating feature includes an aperture in the cover sized to receive a command actuator and the electronic device has at least one command receptive portion that allows a user to operate the electronic device, and wherein when the cover is coupled to the electronic device, the aperture is positioned adjacent the command receptive portion of the electronic device such that the command actuator can be inserted through the aperture to actuate the command receptive portion of the electronic device.

3. The cover of claim 1, wherein the cover has a keypad with a plurality of independently depressible kevs. and wherein the button is one of the keys.

4. The cover of claim 1, wherein the device is a personal digital assistant (PDA), and the key is a power key actuatable to turn the PDA on and off.

5. The cover of claim 1, wherein the key on the device protrudes from a surrounding area on the device.

6. The cover of claim 1, wherein the window of the cover is sized to allow more than half of the screen of the device to be viewed when the cover is overlying the device.

7. A cover for an electronic device having, a screen, the cover comprising:

a window and at least first and second buttons, the cover being coupleable with the electronic device such that the window of the cover overlies at least a portion of the screen of the electronic device, wherein the screen of the electronic device is configurable to have a touch-sensitive portion and the first button is depressible into contact with the touch sensitive portion, and wherein the electronic device has at least one physical key and the second button is depressible into contact with the key to cause the key to operate.

* * * * *